United States Patent
Gunther

(10) Patent No.: US 12,461,403 B2
(45) Date of Patent: Nov. 4, 2025

(54) ACOUSTO-OPTIC MODULATION FOR PHOTORECEPTOR PROTECTION

(71) Applicant: The Boeing Company, Arlington, VA (US)

(72) Inventor: Brian Gunther, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 413 days.

(21) Appl. No.: 18/162,849

(22) Filed: Feb. 1, 2023

(65) Prior Publication Data
US 2024/0255786 A1    Aug. 1, 2024

(51) Int. Cl.
   *G02F 1/11*   (2006.01)
   *B64C 1/14*   (2006.01)
   *B64D 47/08*  (2006.01)

(52) U.S. Cl.
   CPC ............ *G02F 1/113* (2013.01); *B64C 1/1476* (2013.01); *B64D 47/08* (2013.01); *G02F 2203/01* (2013.01)

(58) Field of Classification Search
   CPC .. G02F 1/113; G02F 1/11; G02F 1/116; G02F 1/292; G02F 1/33; G02F 2203/01; B64C 1/1476; B64C 1/1492; B64D 47/08
   USPC ........................................................ 359/285
   See application file for complete search history.

(56) References Cited

U.S. PATENT DOCUMENTS

| | | | |
|---|---|---|---|
| 10,437,132 B1* | 10/2019 | Koehler | H04N 25/671 |
| 2017/0248811 A1* | 8/2017 | Clemen, Jr. | B64C 1/1484 |
| 2018/0088236 A1* | 3/2018 | Eichenholz | H01S 3/10023 |
| 2019/0068863 A1* | 2/2019 | Boer | B64D 47/08 |
| 2019/0294024 A1 | 9/2019 | Koehler | |
| 2021/0278710 A1* | 9/2021 | Lange | G06E 1/02 |
| 2022/0146378 A1* | 5/2022 | Vana | G01N 1/2273 |
| 2023/0251512 A1* | 8/2023 | Wasilousky | H01S 5/0085 |
| | | | 359/107 |

OTHER PUBLICATIONS

Schweicher, E. et al., "Acousto-Optical Signal Processing and Integrated Optics", Revue HF, Soc. Belge Des Ing. Des. Telecomm. & D'Elexxtronique, Brussell, BE, vol. 14, No. 3/04, Jan. 1, 1988, pp. 88-122.

* cited by examiner

*Primary Examiner* — William R Alexander
(74) *Attorney, Agent, or Firm* — Yee & Associates, P.C.

(57) ABSTRACT

An acousto-optic modulator system for protecting a photoreceptor from an incident laser beam from a laser source includes a transducer array that is connected to a glass portion. The glass portion is arranged in a predicted path of the laser beam between the laser source and the photoreceptor. An electronic control unit ("ECU") selectively energizes the transducer array and causes the transducer array to emit sound pressure waves into the glass portion. The sound pressure waves have predetermined oscillation characteristics that change a refractive index of the glass portion to diffract the beam. A camera system includes the transducer array, the ECU, and a camera having an image sensor and an external lens positioned in the predicted path. A host aircraft includes the photoreceptor, fuselage, one or more wings, the glass portion, the transducer array, and the ECU.

20 Claims, 4 Drawing Sheets

ACOUSTO-OPTIC MODULATION FOR PHOTORECEPTOR PROTECTION

TECHNICAL FIELD

The present disclosure relates to automated systems and methods for protecting a photoreceptor from a laser beam.

BACKGROUND

High-energy coherent light beams are used in a wide range of applications. For example, visible and infrared ("IR") laser beams may be produced using a single-wavelength light source, e.g., a laser diode. A laser beam emitted by a laser device travels through a transmission medium, typically an optical fiber or free space, and propagates in a straight line while maintaining a constant cross-sectional size and shape. As a result, lasers are particularly useful in precision applications such as vehicle navigation, long-range optical communication, range finding, obstacle detection, and remote imaging. However, laser beams can also be detrimental to precision image sensors and other artificial or natural photoreceptors.

SUMMARY

Disclosed herein are an automated/computer-based system and associated methodology for protecting one or more digital or biological photoreceptors from damage that could otherwise be caused by an incident laser beam. The proposed solutions purposefully introduce sound pressure waves into glass or another structure of a suitable composition for the purpose of diffracting an incident laser beam away from the photoreceptors. This effect, referred to herein and in the general art as the acousto-optic effect, is applied herein to a glass portion, e.g., an external camera lens, window, or canopy. The imparted sound pressure waves periodically expand and compress the glass portion to change its index of refraction, thus creating a diffraction grating in the glass portion. The resulting diffraction grating ultimately diffracts the incident laser beam and thereby protects the photoreceptor(s).

As contemplated herein, a host aircraft may be equipped with a camera having an external lens and one or more photoreceptors collectively forming an image sensor. A transducer array is arranged on or connected to the external lens. In a possible scenario, an incident laser beam may be inadvertently or purposefully directed toward such a camera, or possibly into a cockpit of the host aircraft.

In a non-limiting exemplary embodiment, an acousto-optic modulation system for protecting such a photoreceptor from the incident laser beam includes a transducer array connectable to a surface of a glass portion, and an electronic control unit ("ECU"). The glass portion is arranged in a predicted path of the incident laser beam between a laser source that emits the laser beam and the photoreceptor(s). The ECU is configured to selectively energize the transducer array. This control action causes individual transducers of the transducer array to emit sound pressure waves into the glass portion, with the sound pressure waves having predetermined oscillation characteristics. The predetermined oscillation characteristics in turn are configured to change the refractive index of the glass portion sufficiently for diffracting the incident laser beam away from the photoreceptors.

The transducer array may include one or more piezoelectric transducers in a possible implementation.

The ECU in one or more embodiments is configured to selectively vary a radio frequency ("RF") power level to the transducer array to modify the predetermined oscillation characteristics. An optional human-machine interface ("HMI") device may be placed in communication with the ECU. In such a configuration, the ECU is configured to selectively vary the RF power level to the transducer array in response to a laser frequency selection signal from the HMI device.

The glass portion may have a convex surface in some implementations such that the glass portion projects toward the laser source. For instance, the glass portion may be configured as an external lens of a camera, or alternatively as part of a cockpit canopy of an aircraft. Alternatively, the glass portion may be substantially planar, such as when the glass portion is configured as a flat window pane.

An aspect of the present disclosure also includes a camera system having a camera, a transducer array, and an ECU. The camera includes a photoreceptor in the form of an image sensor, and an external lens positioned in a predicted path of an incident laser beam between a laser source and the image sensor. The transducer array is connected to a major surface of the external lens in this embodiment. The ECU for its part is configured to selectively energize the transducer array and thereby cause the transducer array to emit sound pressure waves into the external lens with predetermined oscillation characteristics. The predetermined oscillation characteristics change a refractive index of the external lens sufficiently for diffracting the incident laser beam away from the image sensor.

Also disclosed herein is a host aircraft having one or more wings connected to a fuselage. The host aircraft also includes a glass portion positioned in a predicted path of an incident laser beam between a laser source of the incident laser beam and a photoreceptor located in or connected to the fuselage. A transducer array is connected to a surface of the glass portion. As part of this representative embodiment of the host aircraft, an ECU is configured to selectively energize the transducer array and thereby cause the transducer array to emit sound pressure waves into the glass portion with predetermined oscillation characteristics. As noted above, the predetermined oscillation characteristics are configured to change a refractive index of the glass portion sufficiently for diffracting the incident laser beam away from the photoreceptor.

The foregoing summary is not intended to represent every possible embodiment or aspect of the subject disclosure. Rather, the summary is intended to exemplify some of the novel aspects and features disclosed herein. The above-noted and other possible features and advantages of the subject disclosure will be readily apparent from the following detailed description of representative embodiments and modes for carrying out the subject disclosure when taken in connection with the accompanying drawings and the appended claims.

Figure 1A:
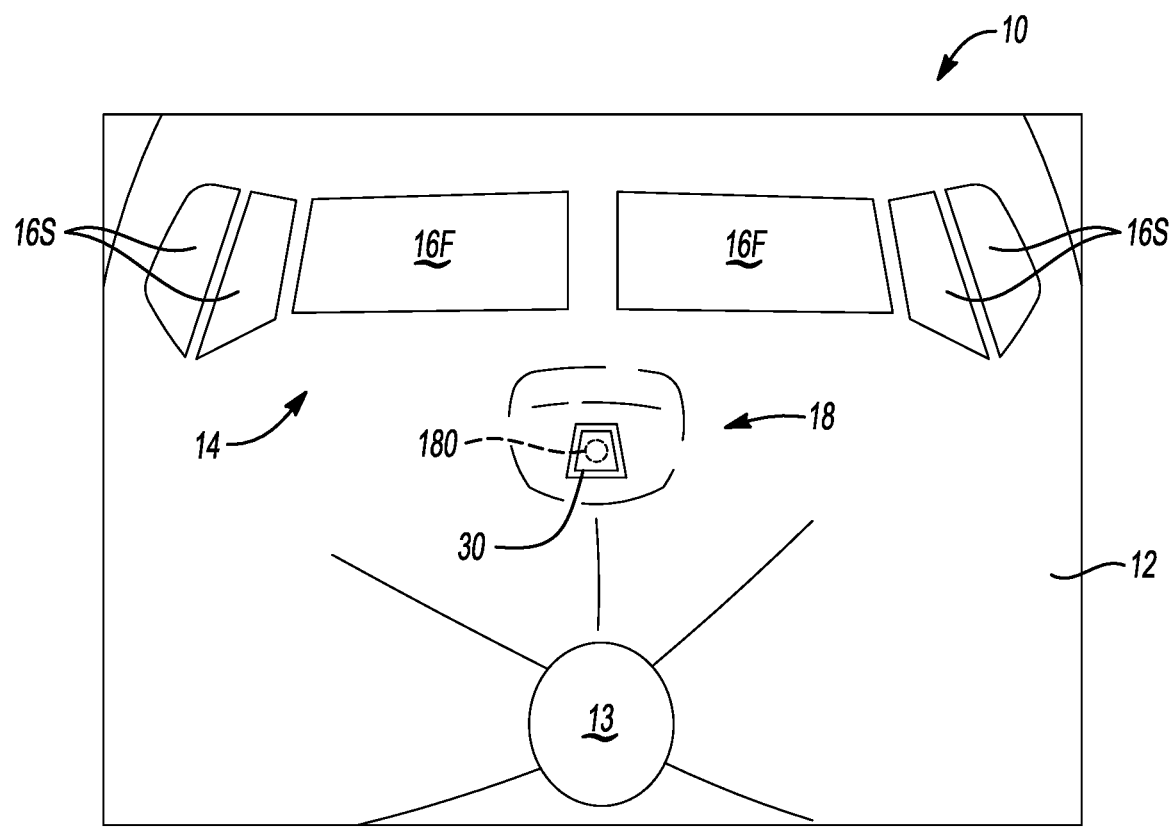
FIG. 1A illustrates a representative host aircraft having a camera mounted in proximity to a cockpit, with the camera having an image sensor that is protected from an incident laser beam by an acousto-optic modulator device as described herein.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover alternatives falling within the scope of the disclosure as defined by the appended claims.

DETAILED DESCRIPTION

Embodiments of the present disclosure are described herein. It is to be understood, however, that the disclosed embodiments are illustrative examples, and that other embodiments can take various and alternative forms. The Figures are not necessarily to scale and may be schematic. Some described features may be exaggerated or minimized, e.g., to show details of particular components. Therefore, specific structural and functional details disclosed herein are not to be interpreted as limiting, but merely as a representative basis for teaching one skilled in the art to variously employ the present disclosure.

Additionally, various features illustrated and/or described with reference to the Figures may be combined with features illustrated in one or more other Figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "fore," "aft," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 1B:
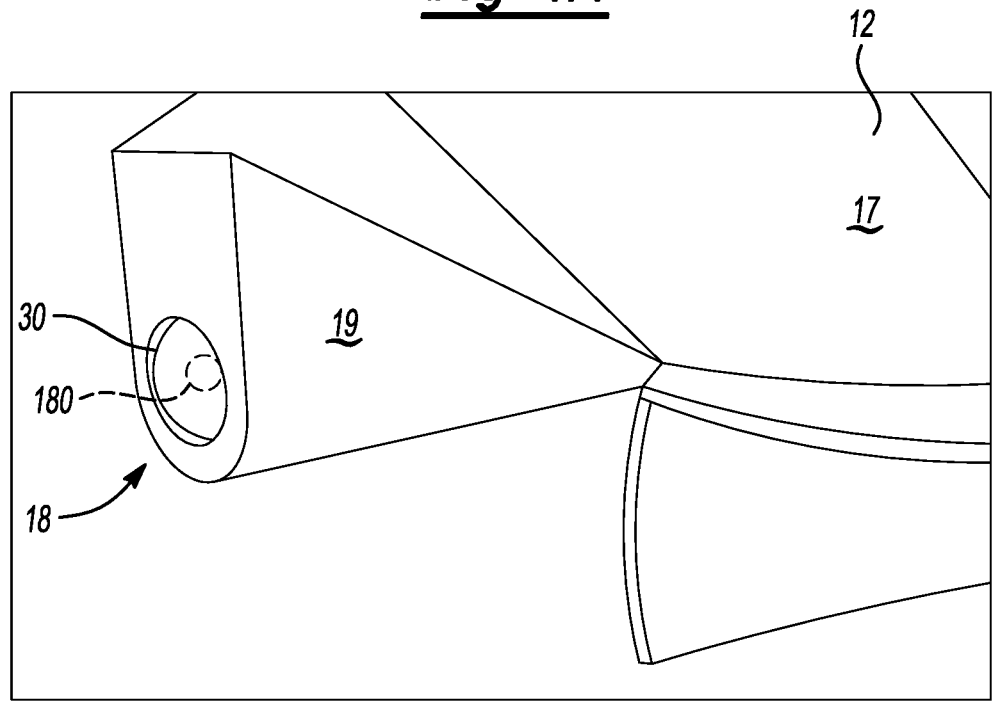
FIGS. 1B and 1C illustrate alternative fuselage-mounted and wing-mounted variations of the camera shown in FIG. 1A.
Figure 1C:
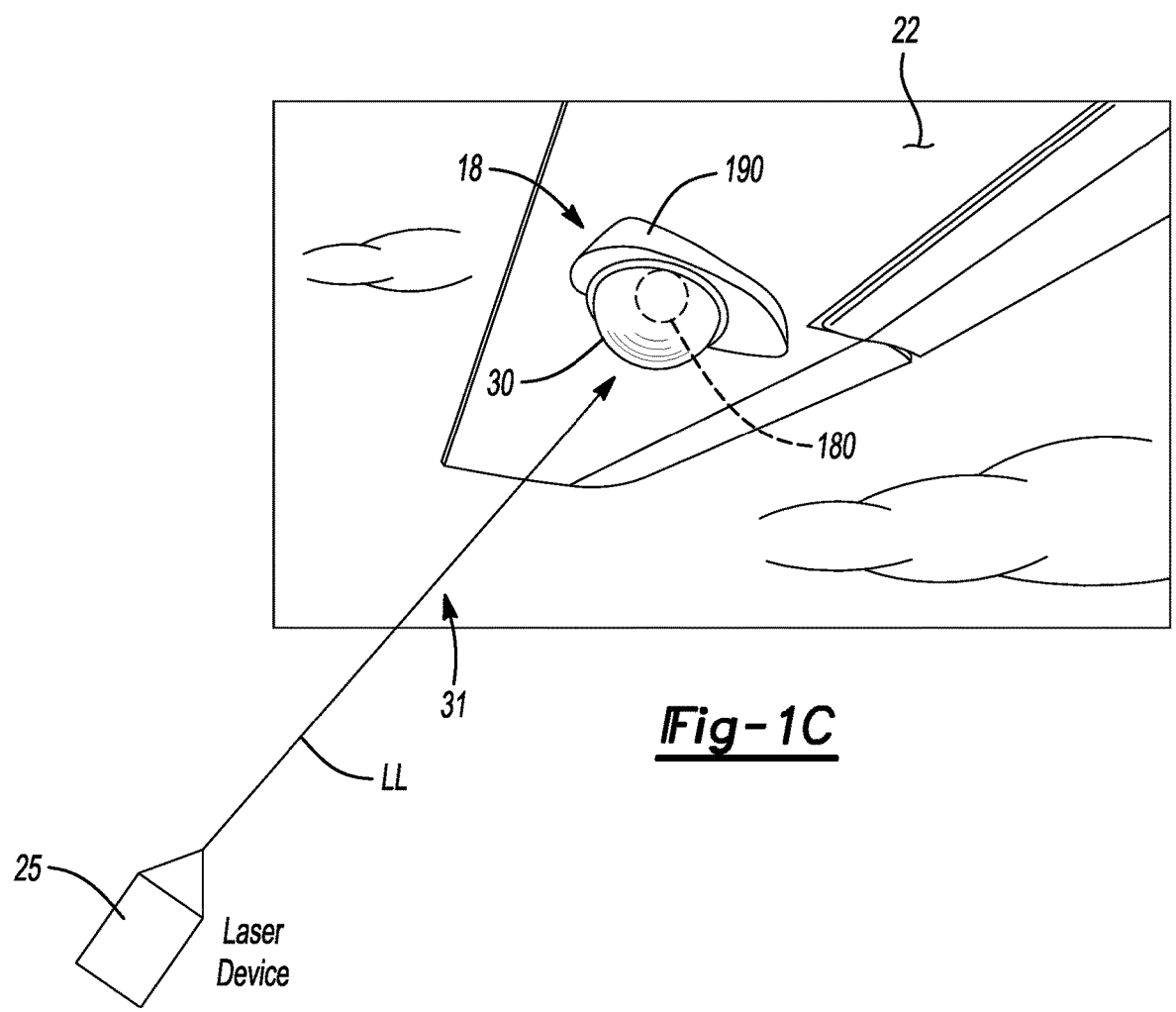

Referring to the drawings, wherein like reference numbers refer to like components, a representative vehicle in the form a host aircraft 10 is depicted in FIGS. 1A, 1B, and 1C. As shown in FIG. 1A, the host aircraft 10 includes a fuselage 12, a nose 13, and a cockpit 14 arranged proximate the nose 13. One or more front windows 16F and side windows 16S provide visibility to a pilot and other aircrew (not shown) seated within the cockpit 14. Similar side windows 16S may be arranged at other locations of the fuselage 12, e.g., between the cockpit 14 and a tail (not shown) of the host aircraft 10 depending on the particular configuration of the fuselage 12.

In some embodiments, a camera 18 may be connected to the host aircraft 10. Such a camera 18 could be configured to monitor, surveil, or remotely sense items of interest while the host aircraft 10 is in flight. To that end, the camera 18 is equipped with one or more photoreceptors in the form of image sensors 180. Depending on the mission, each image sensors 180 may be variously configured as, e.g., an electro-optical photoreceptor such as a charge coupled device ("CCD") or a complementary metal-oxide-semiconductor ("CMOS") or another Active Pixel Sensor ("APS"), providing a digital photoreceptor on an integrated circuit, or alternatively a short-wave infrared ("SWIR") sensor, a quantum dot ("QDOT") sensor, etc. Such image sensors 180 could be tuned to collect image data in a particular wavelength band, e.g., infrared, red-green-blue ("RGB")/visible and/or multi-spectral.

To that end, the camera 18 may be securely mounted to the host aircraft 10 in a position facing a potential imaged target, e.g., to the fuselage 12 near the nose 13 (FIG. 1A), to an undersurface 17 of the fuselage 12 (FIG. 1B) via a camera housing 19, or beneath one or more wings 22 via a camera housing 190 (FIG. 1C), with the wing(s) 22 being connected to the fuselage 12. The host aircraft 10 when performing a mission utilizing the remote imaging or sensing capabilities of the camera 18 at times may be intentionally targeted by or inadvertently exposed to a laser beam (LL) emitted from a laser source 25, as best shown in FIG. 1C. Irradiation of the image sensor 180 by the incident laser beam (LL) can overload or damage the image sensor 180. In some instances, the laser beam (LL) could be directed into the eyes of aircrew situated within the cockpit 14 of FIG. 1A or elsewhere aboard the host aircraft 10. To ward against damage or interference, therefore, the camera 18 is equipped with an acousto-optic modulation device ("A-O modulator") 26 as set forth in detail hereinbelow and depicted in FIGS. 3 and 4.

More specifically, the A-O modulator 26 as contemplated herein can be incorporated into the structure and control architecture of the representative host aircraft 10 of FIGS. 1A-1C to help protect the image sensors 180 from damage or interference from the incident laser beam (LL). To this end, a glass portion 30 of the camera 18 in this embodiment is positioned in a predicted path 31 of the incident laser beam (LL), i.e., between a source of the incident laser beam (LL), for instance the laser source 25 of FIG. 1C, and the camera 18. The glass portion 30 may be constructed of hardened glass or another application-suitable material such as polycarbonate or germanium, and may be convex in one or more embodiments. In such a construction, the glass portion 30 projects toward the incident laser beam (LL), for instance as illustrated in FIG. 1C.

Figure 2A:
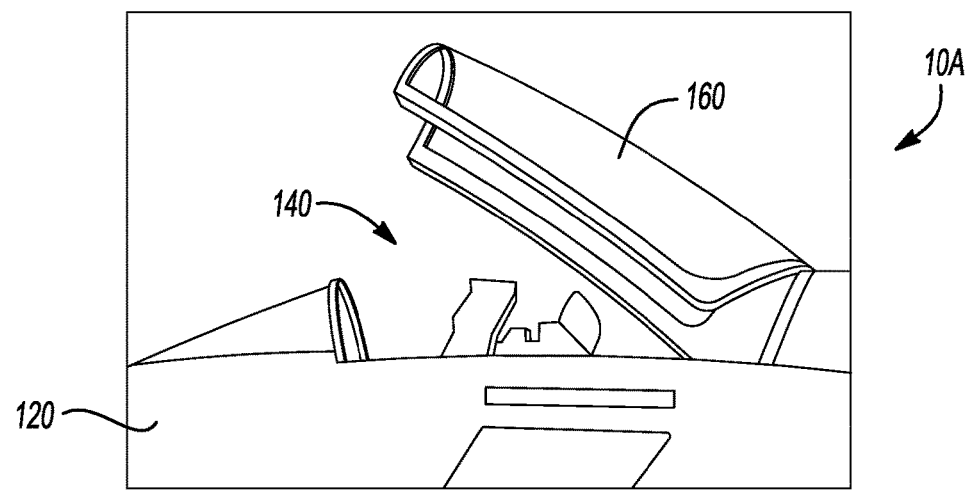
FIGS. 2A and 2B are representative curved and planar glass portions that may be used in different embodiments of the disclosure.
Figure 2B:
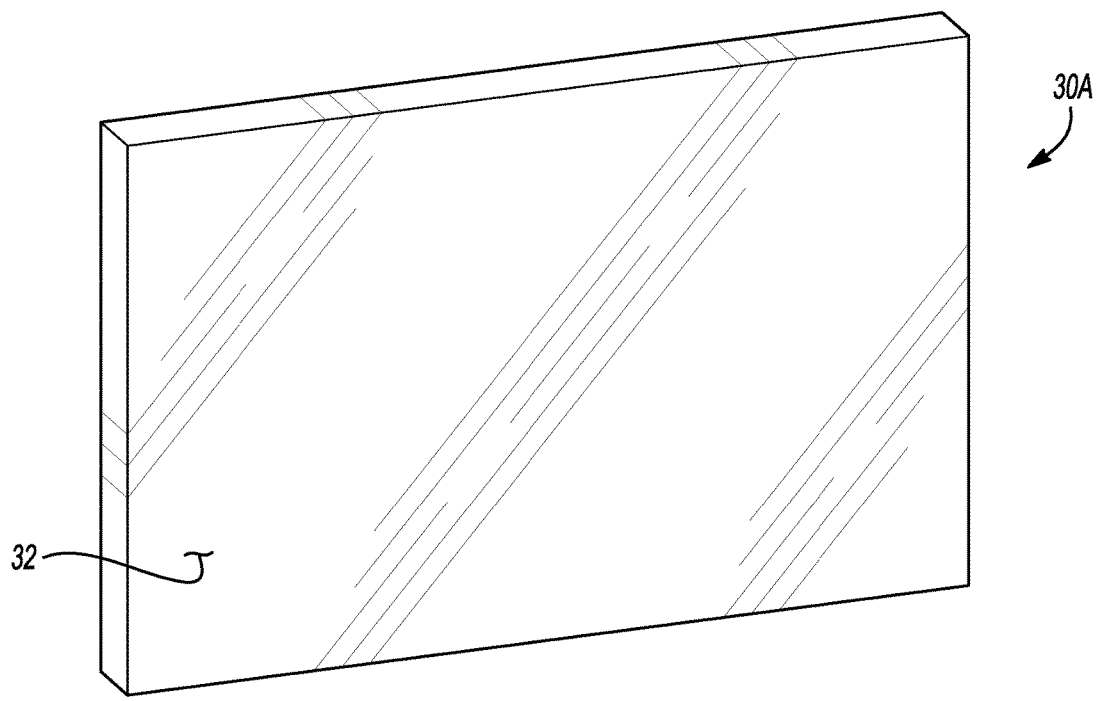

By way of example and not of limitation, the glass portion 30 having a convex or curvilinear surface configuration could be configured as an external lens of the camera 18 (FIGS. 1B and 1C). Alternatively, the glass portion 30 could be configured as part of a cockpit canopy 150 of a host aircraft 10A as illustrated in FIG. 2A, e.g., a bubble canopy pivotably mounted to a fuselage 120 to enclose a cockpit 140 and protect an aircrew (not shown) seated therein while providing an unobstructed view of the surrounding airspace. Such an implementation could be described as curvilinear or curved, and thus still generally convex in the direction of the laser beam (LL) of FIG. 1C. The glass portion 30 in other embodiments may be substantially planar or flat, with an alternative glass portion 30A of this configuration being illustrated in FIG. 2B in the form of a window pane presenting a major surface 32 toward the incident laser beam (LL).

Figure 3:
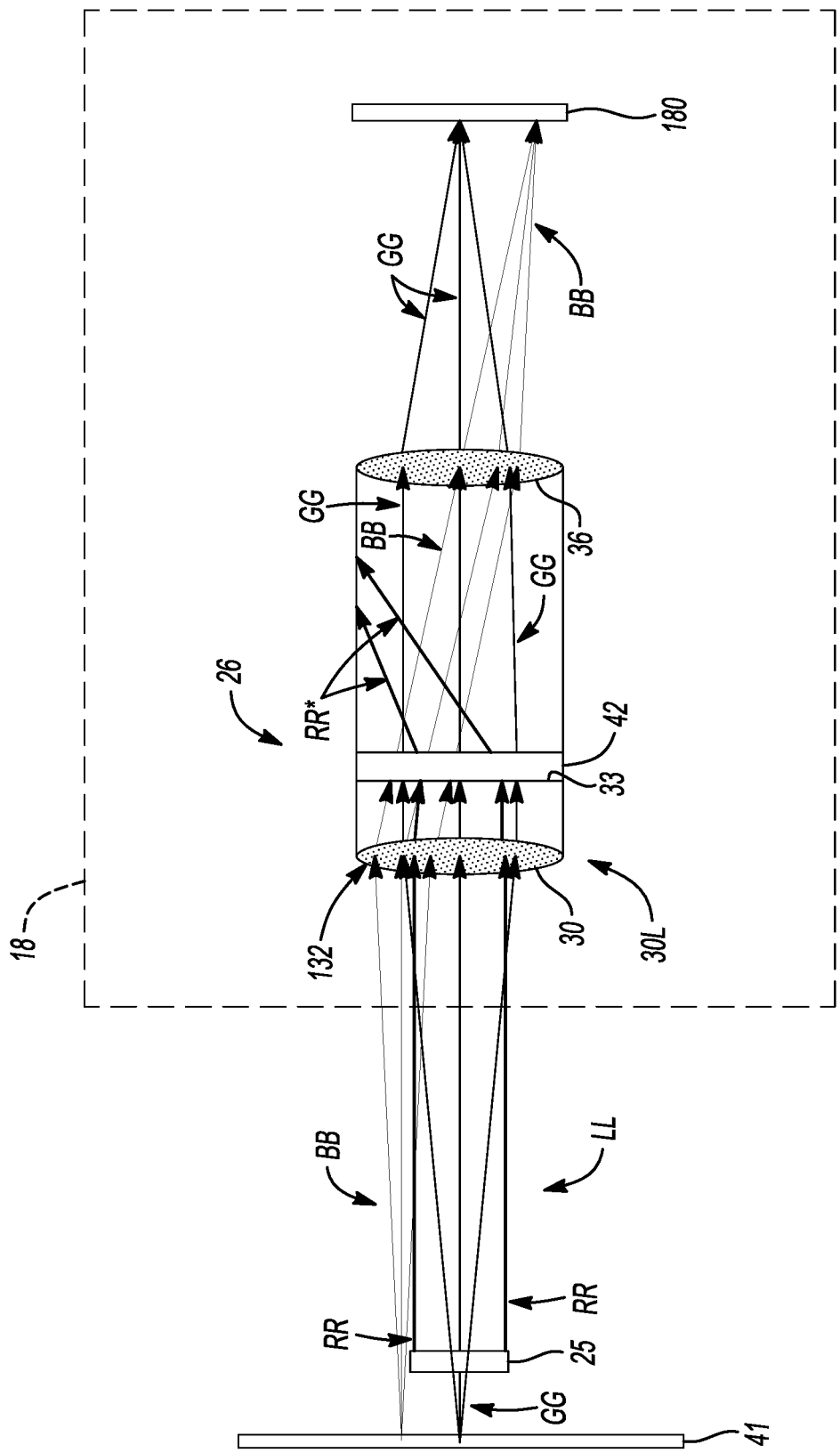
FIG. 3 is a side-view illustration of a camera equipped with an acousto-optic modulator device in accordance with an aspect of the disclosure.

Referring now to FIG. 3, an exemplary scenario benefiting from the present teachings, a camera 18 equipped with the A-O modulator 26 is shown being irradiated by the incident laser beam (LL), in this instance red light ("RR") from the laser source 25. Visible light of other wavelengths, e.g., blue light ("BB") and green light ("GG"), could reflect off of an object 41, e.g., an imaging target of the camera 18. Detection of light in the blue and green band of the electromagnetic spectrum is desirable in this scenario, with light in the red band being undesirable or possibly harmful to the image sensors 180. In this instance, the A-O modulator 26 could be controlled to diffract the red light (RR) away from the image sensors 180.

To this end, a transducer array 42 of the A-O modulator 26 is integrated into the structure of the above-described camera 18. For instance, the transducer array 42 could be implemented as one or more piezoelectric transducers 142 (FIG. 4) collectively connected to a surface 33 of the glass portion 30, which in this instance configured as an external camera lens 30L of the camera 18. The incident laser beam (LL) passes into a major surface 132 of the external camera lens 30L. When the transducer array 42 is selectively activated as described below, the transducer array 42 imparts vibration energy into the glass portion 30, with the vibration energy having predetermined oscillation characteristics. These characteristics change the refractive index of the glass portion 30/external camera lens 30L and thereby causes diffraction of light of a predetermined or calibrated wavelength, in this instance the red light (RR). The diffracted red light (RR*) thus passes safely away from the image sensor 180 shown at the far right of FIG. 3.

Figure 4:
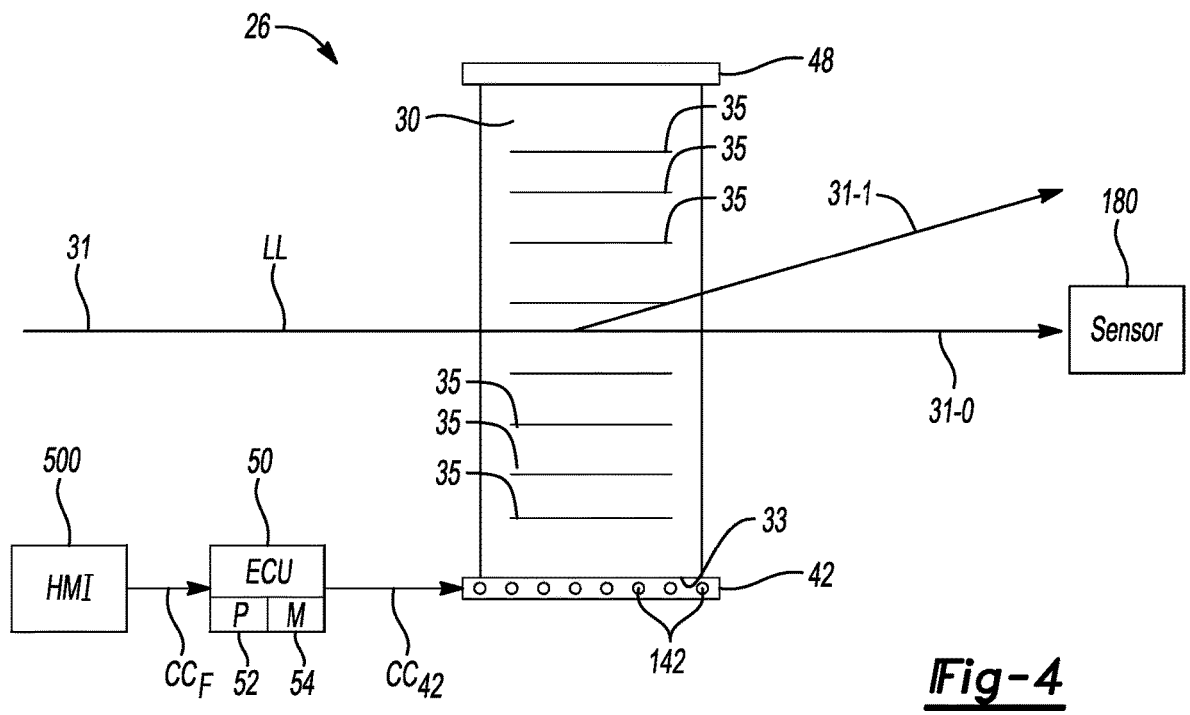
FIG. 4 is a side-view illustration of a portion of the acousto-optic modulator device for use with the camera of FIG. 3 or other photoreceptor systems.

An exemplary embodiment of the A-O modulator 26 is shown in FIG. 4 in which an electronic control unit ("ECU") 50 is used to control an ON/OFF oscillating state of the transducer array 42. to emit pressure waves 35 (see FIG. 4) into the glass portion 30, with the pressure waves 35 having predetermined oscillation characteristics configured to change a refractive index of the glass portion 30 sufficiently for diffracting the incident laser beam (LL) away from the image sensor 180 or other targeted photoreceptor. Desirable diffraction occurs only with respect to the red light (RR), thus allowing the blue light (BB) and green light (GG) to pass through to an imaging lens 36 of the camera 40 for detection by the image sensor 180.

Referring briefly to FIG. 4, an aspect of the disclosure includes a camera system 11, i.e., the camera 18 of FIGS. 1A-C and 3 and its image sensor 180, the transducer array 42, and the ECU 50. The ECU 50 is in communication with the transducer array 42, e.g., via one or more wires or other transfer conductors (not shown) or wirelessly. The A-O modulator 26 of FIG. 4 includes an energy-absorbing material 48 disposed opposite the transducer array 42, e.g., a polymeric or other passive high-loss element whose presence reduces or eliminates reflection of the sound pressure waves 35 back toward the major surface 33 proximate the transducer array 42.

The ECU 50 selectively activates the transducer array 42 via input control signals ($CC_{42}$), e.g., a voltage signal, which the transducer array 42 then converts to mechanical vibrations. As noted above for example, the transducers 142 of the transducer array 42 could be configured as piezoelectric devices, such that receipt of the input control signals ($CC_{42}$) effectively applies a voltage across piezoelectric crystals (not shown) therein and causes such crystals to deform, thereby resulting in controlled oscillation.

Transmission of the input control signals ($CC_{42}$) by the ECU 50 in turn causes the transducer array 42 to emit sound pressure waves 35 into the glass portion 30. As shown, the incident path 31 of the incident laser beam 31 is directed toward a laser target, i.e., the image sensor 180 in the illustrated exemplary scenario of FIG. 4. In order to diffract the laser beam (LL) before the laser beam (LL) can reach the image sensor 180, the A-O modulator 26 is positioned in the incident path 31 and controlled via operation of the ECU 50.

For instance, the ECU 50 having a hardware and software configuration as described below may be configured to modify the above-noted predetermined oscillation characteristics, specifically the frequency and possibly amplitude of oscillation, and thus the characteristics of the sound pressure waves 35 propagating through the materials of the glass portion 30. The sound pressure waves 35 act as moving periodic planes of expansion and compression within the glass portion 30, thereby causing scattering and interference and, ultimately, diffraction of undesirable wavelengths of the incident laser beam (LL). Such sound pressure waves 35 change the refractive index of the glass portion 30 as the laser beam (LL) passes into and partially through the glass portion 30. The change in refractive index is commanded by the ECU 50 at a level sufficient for diffracting the incident laser beam (LL) away from the image sensor 180, and thus the manner and extent to which the ECU 50 controls the output of the transducer array 42 depends on the characteristics of the laser beam (LL).

Diffraction is represented in FIG. 4 by frequency components 31-0 and 31-1, which respectively represent $0^{th}$ order and $1^{st}$ order frequency components of the laser beam (LL) initially propagating along its incident path 31. When the ECU 50 ceases energizing the transducer array 42, the sound pressure waves 35 are discontinued. In this instance, the $0^{th}$ order frequency component will pass straight through the glass portion 30, thereafter falling incident upon the image sensor 180. Performance of the A-O modulator 26 may therefore be tuned such that energizing the transducer array 42 via the input control signals ($CC_{42}$) results in the $1^{st}$ order frequency component 31-0, thus resulting diffraction of the laser beam (LL) away from the image sensor 180.

In one or more optional embodiments, a human-machine interface ("HMI") device 500 may be placed in wired or wireless communication with the ECU 50. The ECU 50 in such embodiments may selectively vary a radio frequency ("RF") power level delivered to the transducer array 42, e.g., in response to a user-selected or autonomously-selected frequency selection signal (arrow $CC_F$) from the HMI device 500. Modification of the RF power level is achieved via the input control signals ($CC_{42}$).

The ECU 50 of FIGS. 1 and 2 may operate herein as a process controller, and may be optionally embodied as one or more digital computer systems configured to execute computer-readable instructions. As contemplated herein, the ECU 50 of FIG. 4 includes one or more processor(s) 52 implemented, e.g., as microcontrollers, one or more Application Specific Integrated Circuit(s) (ASICs), Field-Programmable Gate Array (FPGAs), electronic circuits, central processing units (CPUs), etc.

The ECU 50 also includes a computer-readable storage medium, shown schematically as memory 54. The memory 54 in turn includes associated transitory and non-transitory memory/storage component(s), e.g., read only memory, programmable read only memory, solid-state memory, random access memory, optical and/or magnetic memory, etc. Computer-readable instructions for controlling the A-O modulator 26 may be recorded in memory 54 and executed by the processor(s) 52, e.g., as machine-readable code/instructions, software, and/or firmware programs.

Other hardware components of the ECU 50 of FIG. 4 are omitted for simplicity but are well understood in the art, such as combinational logic circuits, input/output circuits, digital and analog signal conditioning/buffer circuitry, and other hardware components that may be accessed as needed by the processor(s) 52 to provide the control functionality described herein.

The A-O modulator 26 described in detail above may be integrated into a myriad of light-sensitive systems, exemplified herein as the architecture of the camera 18 and its resident image sensor 180 of FIGS. 1A-C. Use of the A-O modulator 26 provides the image sensor(s) 180 with added protection against damage or degradation from the incident laser beam LL of FIG. 1C. While the various example use scenarios provided above are directed to the camera 18, those skilled in the art will appreciate that the present teachings may be extended to a wide range of electrical and electromechanical sensors, as well as to the natural photoreceptors of the human eye.

In the latter case, in keeping with the representative host aircraft 10 of FIG. 1, the A-O modulator 26 could be integrated into a portion of the front windows 16F or side windows 16S of FIG. 1, or perhaps into similarly configured transparent visors (not shown) of the types sometimes worn, e.g., by aircrew of military or search-and-rescue aircraft. Selective activation of the transducer array 42 in such an implementation could possibly be used to protect eyesight from stray or directed laser energy, such as when flying over a particular ground location at which such laser energy was previously experienced or is more likely to occur. These and other potential benefits of acousto-optic modulation as specified herein will be apparent to one skilled in the art in view of the foregoing disclosure.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The following Clauses provide example configurations of an acousto-optic modulator system and method for protecting a photoreceptor from an incident laser beam from a laser source in accordance with the disclosure, as shown in the exemplary scenario of FIGS. 1A-4 and disclosed herein.

Clause 1: An acousto-optic modulator system for protecting a photoreceptor from an incident laser beam from a laser source, comprising: a transducer array connected to a major surface of a glass portion, wherein the glass portion is situated between the laser source and the photoreceptor; and an electronic control unit ("ECU") in communication with the transducer array, wherein the ECU is configured to selectively energize the transducer array and thereby cause the transducer array to emit sound pressure waves into the glass portion, the sound pressure waves having predetermined oscillation characteristics configured to change a refractive index of the glass portion sufficiently for diffracting the incident laser beam away from the photoreceptor.

Clause 2: The system of clause 1, wherein the transducer array includes one or more piezoelectric transducers.

Clause 3: The system of either of clauses 1 or 2, wherein the ECU is configured to selectively vary a radio frequency ("RF") power level to the transducer array to modify the predetermined oscillation characteristics.

Clause 4: The system of clause 3, further comprising: a human-machine interface ("HMI") device in communication with the ECU, wherein the ECU is configured to selectively vary the RF power level to the transducer array in response to a frequency selection signal from the HMI device.

Clause 5: The system of any of clauses 1-4, wherein the glass portion is convex and projects toward the laser source.

Clause 6: The system of clause 5, wherein the glass portion is an external lens of a camera and the photoreceptor is part of an image sensor of the camera.

Clause 7: The system of clause 5, wherein the glass portion is configured as part of a canopy of an aircraft.

Clause 8: The system of any of clauses 1-4, wherein the glass portion is substantially planar or flat.

Clause 9: The system of clause 8, wherein the glass portion is a window pane.

Clause 10: A camera system comprising: a camera having: a photoreceptor configured as an image sensor; and an external lens positioned in a predicted path of an incident laser beam between the image sensor and a laser source that emits the incident laser beam; a transducer array connected to a major surface of the external lens; and an electronic control unit ("ECU") in communication with the transducer array, wherein the ECU is configured to selectively energize the transducer array and thereby cause the transducer array to emit sound pressure waves into the external lens with predetermined oscillation characteristics, the predetermined oscillation characteristics being configured to change a refractive index of the external lens sufficiently for diffracting the incident laser beam away from the image sensor.

Clause 11: The camera system of clause 10, wherein the transducer array includes one or more piezoelectric transducers.

Clause 12: The camera system of either of clauses 9 or 10, wherein the ECU is configured to selectively vary a radio frequency ("RF") power level to the transducer array to modify the predetermined oscillation characteristics.

Clause 13: The camera system of clause 12, further comprising: a human-machine interface ("HMI") device in communication with the ECU, wherein the ECU is configured to selectively vary the RF power level to the transducer array in response to a frequency selection signal from the HMI device.

Clause 14: The camera system of any of clauses 10-14, wherein the external lens is convex such that the external lens projects toward the laser source.

Clause 15: A host aircraft comprising: a photoreceptor; a fuselage; one or more wings connected to the fuselage; and a glass portion positioned in a predicted path of an incident laser beam from a laser source, wherein the predicted path extends between the laser source and the photoreceptor; a transducer array connected to a surface of the glass portion; and an electronic control unit ("ECU") in communication with the transducer array, wherein the ECU is configured to selectively energize the transducer array and thereby cause the transducer array to emit sound pressure waves into the glass portion with a predetermined oscillation characteristics, the predetermined oscillation characteristics being configured to change a refractive index of the glass portion sufficiently for diffracting the incident laser beam away from the photoreceptor.

Clause 16: The host aircraft of clause 15, further comprising: a camera system mounted to the fuselage or the wings, the camera system including a camera having an external lens and an image sensor, wherein the photoreceptor is part of the image sensor, and wherein the glass portion is configured as the external lens.

Clause 17: The host aircraft of clause 16, wherein the external lens is convex such that the external lens projects toward the laser source.

Clause 18. The host aircraft of any of clauses 15-17, wherein the ECU is configured to selectively vary a radio frequency ("RF") power level to the transducer array to modify the predetermined oscillation characteristics.

Clause 19: The host aircraft of clause 18, further comprising: a human-machine interface ("HMI") device in communication with the ECU, wherein the ECU is configured to selectively vary the RF power level to the transducer array in response to a frequency selection signal from the HMI device.

Clause 20. The host aircraft of clause 15, further comprising: at least one of a convex canopy or a flat window pane connected to the fuselage, wherein the glass portion is part of the convex canopy or the flat window pane.

While various embodiments have been described, the description is intended to be exemplary rather than limiting. It will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. An acousto-optic modulator system, comprising:
   a transducer array connected to a major surface of a glass portion, wherein the glass portion is situated between a laser source and a photoreceptor; and
   an electronic control unit ("ECU") in communication with the transducer array, wherein the ECU is configured to selectively energize the transducer array and thereby cause the transducer array to emit sound pressure waves into the glass portion, the sound pressure waves having predetermined oscillation characteristics configured to change a refractive index of the glass portion sufficiently for diffracting an incident laser beam from the laser source away from the photoreceptor to protect the photoreceptor from the incident laser beam.

2. The system of claim 1, wherein the transducer array includes one or more piezoelectric transducers.

3. The system of claim 1, wherein the ECU is configured to selectively vary a radio frequency ("RF") power level to the transducer array to modify the predetermined oscillation characteristics.

4. The system of claim 3, further comprising:
   a human-machine interface ("HMI") device in communication with the ECU, wherein the ECU is configured to selectively vary the RF power level to the transducer array in response to a frequency selection signal from the HMI device.

5. The system of claim 1, wherein the glass portion is convex and projects toward the laser source.

6. The system of claim 5, wherein the glass portion is an external lens of a camera and the photoreceptor is part of an image sensor of the camera.

7. The system of claim 5, wherein the glass portion is configured as part of a canopy of an aircraft.

8. The system of claim 1, wherein the glass portion is substantially planar or flat.

9. The system of claim 8, wherein the glass portion is a window pane.

10. A camera system comprising:
    a camera having:
        a photoreceptor configured as an image sensor; and
        an external lens positioned in a predicted path of an incident laser beam between the image sensor and a laser source that emits the incident laser beam;
    a transducer array connected to a major surface of the external lens; and
    an electronic control unit ("ECU") in communication with the transducer array, wherein the ECU is configured to selectively energize the transducer array and thereby cause the transducer array to emit sound pressure waves into the external lens with predetermined oscillation characteristics, the predetermined oscillation characteristics being configured to change a refractive index of the external lens sufficiently for diffracting the incident laser beam away from the image sensor.

11. The camera system of claim 10, wherein the transducer array includes one or more piezoelectric transducers.

12. The camera system of claim 10, wherein the ECU is configured to selectively vary a radio frequency ("RF") power level to the transducer array to modify the predetermined oscillation characteristics.

13. The camera system of claim 12, further comprising:
    a human-machine interface ("HMI") device in communication with the ECU, wherein the ECU is configured to selectively vary the RF power level to the transducer array in response to a frequency selection signal from the HMI device.

14. The camera system of claim 10, wherein the external lens is convex such that the external lens projects toward the laser source.

15. A host aircraft comprising:
    a photoreceptor;
    a fuselage;
    one or more wings connected to the fuselage; and
    a glass portion positioned in a predicted path of an incident laser beam from a laser source, wherein the predicted path extends between the laser source and the photoreceptor;
    a transducer array connected to a surface of the glass portion; and
        an electronic control unit ("ECU") in communication with the transducer array, wherein the ECU is configured to selectively energize the transducer array and thereby cause the transducer array to emit sound pressure waves into the glass portion with predetermined oscillation characteristics, the predetermined oscillation characteristics being configured to change a refractive index of the glass portion sufficiently for diffracting the incident laser beam away from the photoreceptor.

16. The host aircraft of claim 15, further comprising:
a camera system mounted to the fuselage or the wings, the camera system including a camera having an external lens and an image sensor, wherein the photoreceptor is part of the image sensor, and wherein the glass portion is configured as the external lens.

17. The host aircraft of claim 16, wherein the external lens is convex such that the external lens projects toward the laser source.

18. The host aircraft of claim 15, wherein the ECU is configured to selectively vary a radio frequency ("RF") power level to the transducer array to modify the predetermined oscillation characteristics.

19. The host aircraft of claim 18, further comprising:
a human-machine interface ("HMI") device in communication with the ECU, wherein the ECU is configured to selectively vary the RF power level to the transducer array in response to a frequency selection signal from the HMI device.

20. The host aircraft of claim 15, further comprising:
at least one of a convex canopy or a flat window pane connected to the fuselage, wherein the glass portion is part of the convex canopy or the flat window pane.

* * * * *